(12) United States Patent
Voisin

(10) Patent No.: US 9,296,323 B2
(45) Date of Patent: Mar. 29, 2016

(54) VEHICLE EGRESS AID

(71) Applicant: Jonathan Voisin, Pierrefonds (CA)

(72) Inventor: Jonathan Voisin, Pierrefonds (CA)

( * ) Notice: Subject to any disclaimer, the term of this patent is extended or adjusted under 35 U.S.C. 154(b) by 0 days.

(21) Appl. No.: 14/548,521

(22) Filed: Nov. 20, 2014

(65) Prior Publication Data

US 2015/0145268 A1    May 28, 2015

(30) Foreign Application Priority Data

Nov. 22, 2013    (GB) .................................. 1320693.3

(51) Int. Cl.
*B60N 3/00*        (2006.01)
*B60N 3/02*        (2006.01)

(52) U.S. Cl.
CPC . *B60N 3/02* (2013.01); *B60N 3/026* (2013.01)

(58) Field of Classification Search
CPC ........................................................ B60N 3/02
USPC .................................. 296/1.02; 16/436, 110.1
See application file for complete search history.

(56) References Cited

U.S. PATENT DOCUMENTS

| 4,626,016 | A | 12/1986 | Bergsten |
| 6,340,189 | B1 * | 1/2002 | Pordy .......................... 296/1.02 |
| 6,574,833 | B1 | 6/2003 | Tomaiuolo |
| 6,799,353 | B1 * | 10/2004 | Stewart .......................... 16/422 |
| D516,009 | S | 2/2006 | Kontorovich et al. |
| D600,626 | S | 9/2009 | Miller |

FOREIGN PATENT DOCUMENTS

| GB | 2347457 | 6/2000 |
| WO | WO0119642 | 3/2001 |
| WO | WO0144011 | 6/2001 |

* cited by examiner

*Primary Examiner* — Joseph D Pape

(57) ABSTRACT

A vehicle egress aid comprising an elongated body having a pair of grasping members at a distal end thereof, a striker latch engaging member at an opposite end thereof adapted to releasable engage a vehicle door striker latch member, and a lever member located in proximity to the striker latch engaging member and adapted to actuate the striker latch engaging member to engage with and be removed from the vehicle door striker latch member. The vehicle egress aid is further comprised of at least one spacer member located in proximity to the striker latch engaging member and on an opposite side from the lever member, and is adapted to press against a vehicle pillar and provide a more secure connection between the vehicle egress aid and the vehicle.

10 Claims, 4 Drawing Sheets

VEHICLE EGRESS AID

FIELD OF THE INVENTION

The present invention relates generally to mobility assist devices but more particularly to a vehicle egress aid.

BACKGROUND OF THE INVENTION

As population ages, more and more devices are created to aid in improving mobility. Some of those devices are associated with cars to help in getting people in and out of cars.

SUMMARY OF THE INVENTION

It is a main advantage of this invention to provide for a vehicle egress aid.

In order to do so, the invention comprises an elongated body having a pair of grasping members at a distal end thereof, a striker latch engaging member at an opposite end thereof adapted to releasable engage a vehicle door striker latch member, and a lever member located in proximity to the striker latch engaging member and adapted to actuate the striker latch engaging member to engage with and be removed from the vehicle door striker latch member.

The vehicle egress aid is further comprised of at least one spacer member located in proximity to the striker latch engaging member and on an opposite side from the lever member, and Is adapted to press against a vehicle pillar and provide a more secure connection between the vehicle egress aid and the vehicle.

The vehicle egress aid is further comprised of a pad member attached to the at least one spacer member and adapted to contact and protect the vehicle pillar from abrasions that may be caused by the at least one spacer member.

The vehicle egress aid has the pad member formed from a material that is softer than the material forming the at least one spacer member.

The vehicle egress aid has the lever member include a contour member adapted to releasably wrap around the vehicle door striker latch member, a spring to bias a locking pin adapted to releasably lock the contour member into place around the vehicle door striker latch member.

The vehicle egress aid has the striker latch engaging member further include a lever member locking pin release mechanism adapted to allow the locking pin to disengage from the contour member, which in turn disengages from the vehicle door striker latch member allowing the vehicle egress aid to be removed from the vehicle door striker latch member and thereby the vehicle.

The vehicle egress aid has the lever member pivotally attached to the elongated body, and include a grip portion that is adapted to allow a user to easily grip and pivot the lever member to thereby engage the striker latch engaging member with the vehicle door striker latch member.

The vehicle egress aid has the pair of grasping members spaced from one another, each have an oval shape, and each include finger ridges adapted to allow a user to more securely grab the grasping members.

The vehicle egress aid has the shape of the elongated body include at least two curved portions adapted to allow the grasping members to be positioned such that the vehicle egress aid can be easily grabbed and manipulated when being installed, used, and removed.

The vehicle egress aid further includes a plurality of spacer members adapted to be removably attached one on top of the other such that the resulting thickness of the spacer members together can be adjusted to fit differently sized and shaped vehicles.

The vehicle egress aid has the elongated body formed from a material chosen from a lit of materials comprising plastic, metal, aluminum, ceramic, and composites thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the Invention is not limited in its application to the details of construction and to the arrangements of the components set forth in the following description or Illustrated in the drawings. The Invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the Invention, am pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
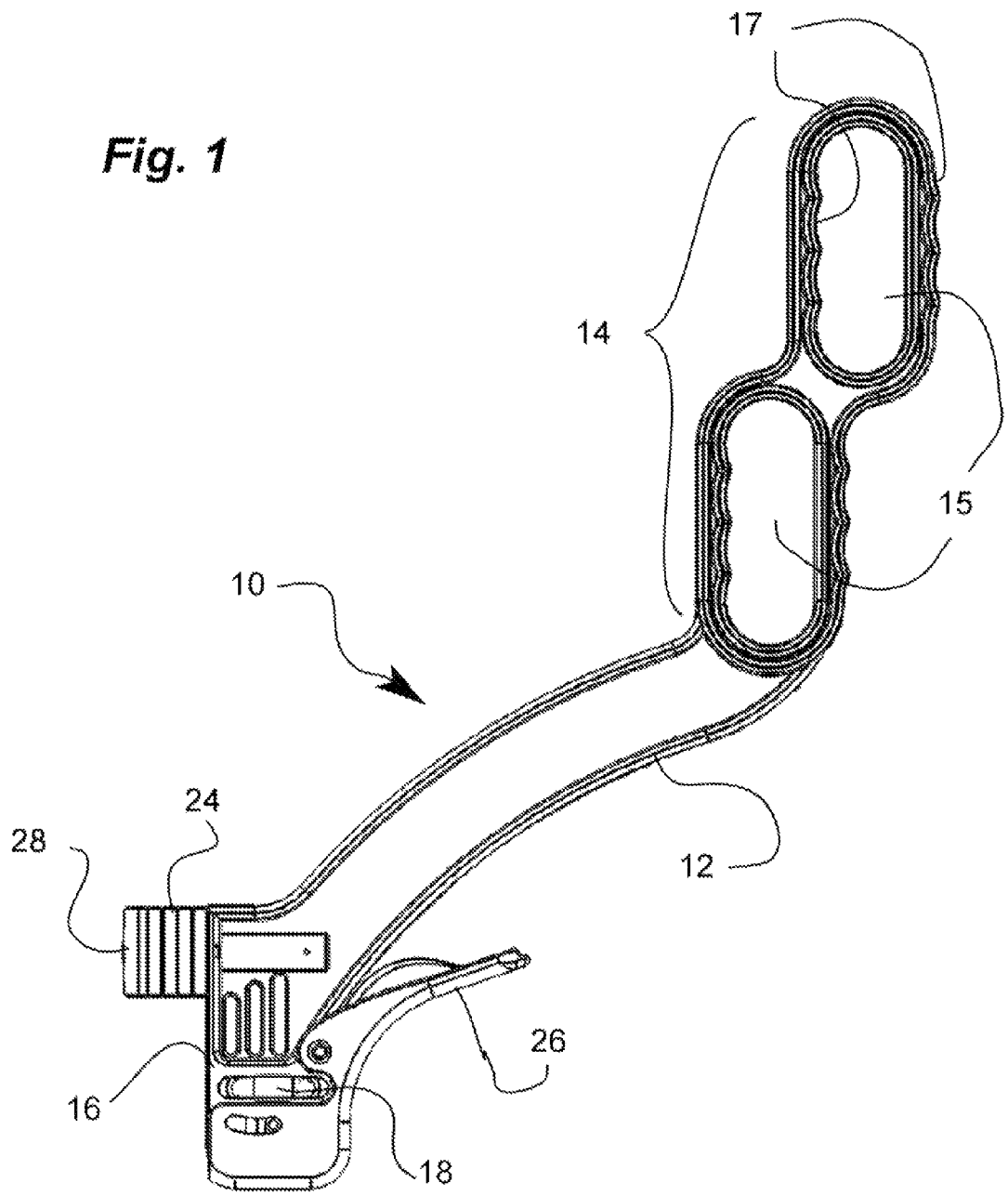
FIG. 1 Side view of the invention.
Figure 2:
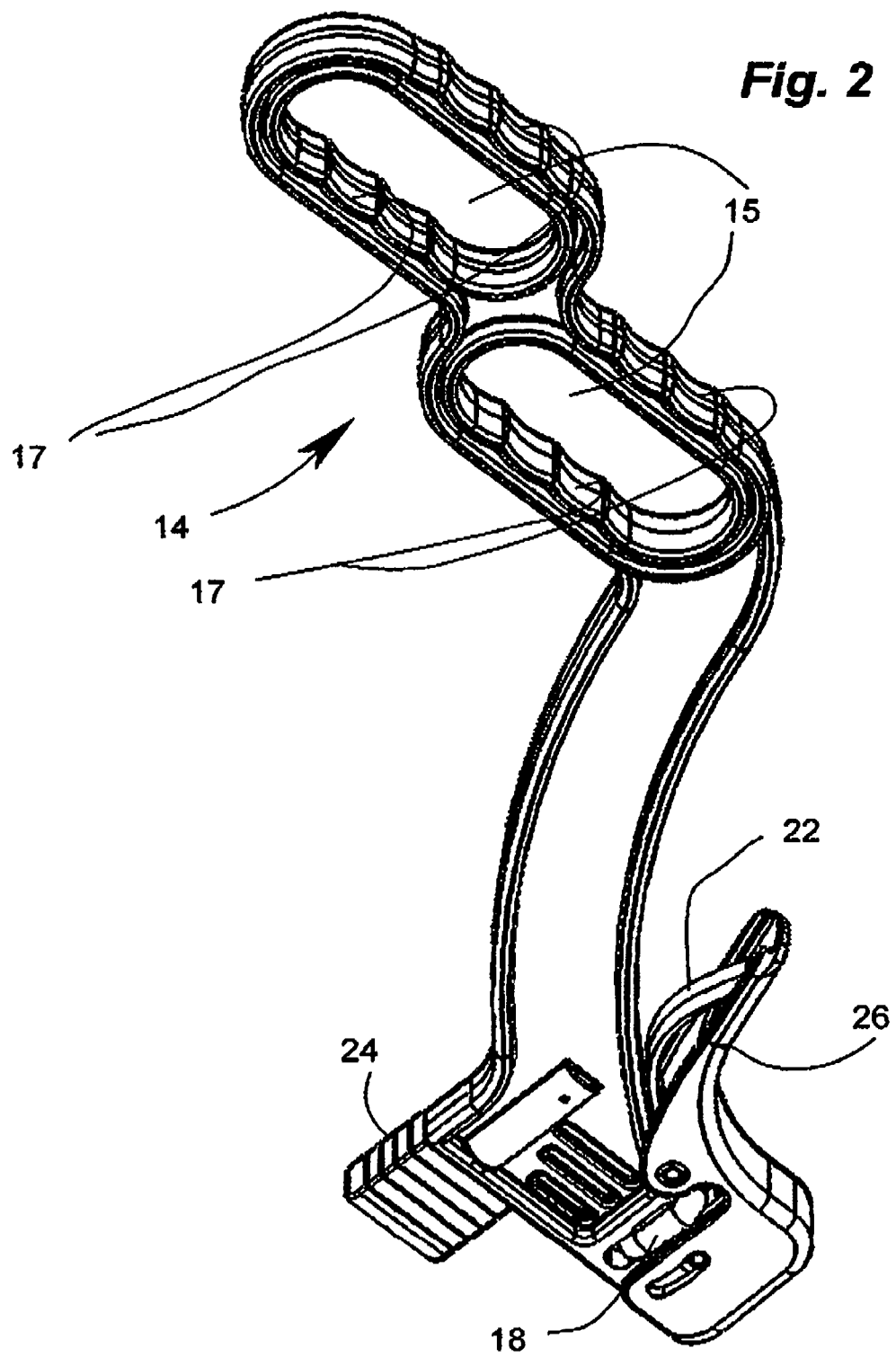
FIG. 2 Isometric view of the invention.
Figure 3A:
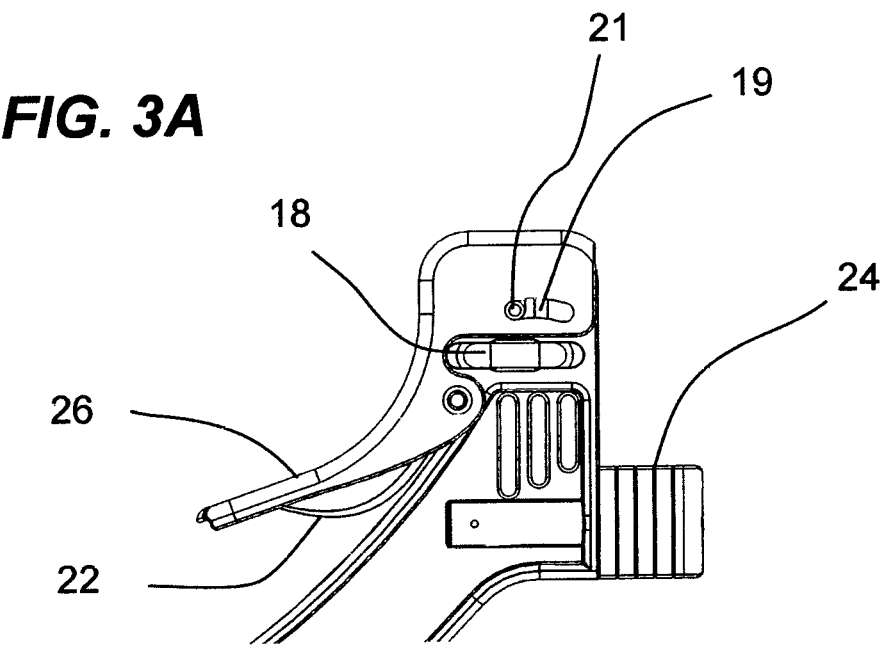
FIGS. 3a-b Lever in the pin engaged and pin released position, respectively.
Figure 3B:
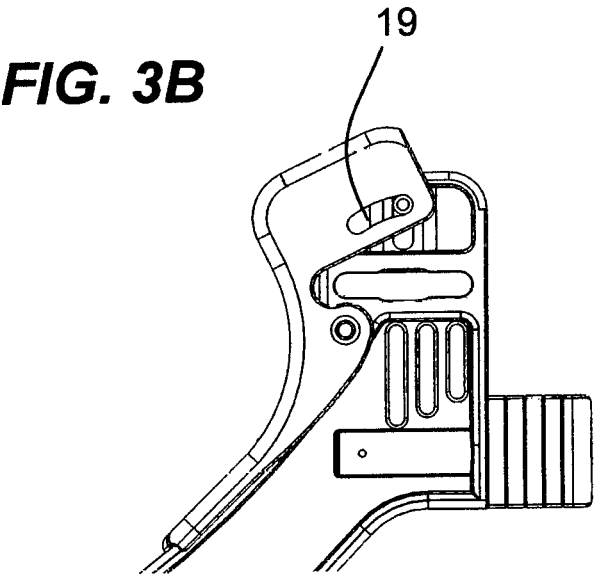
Figure 4:
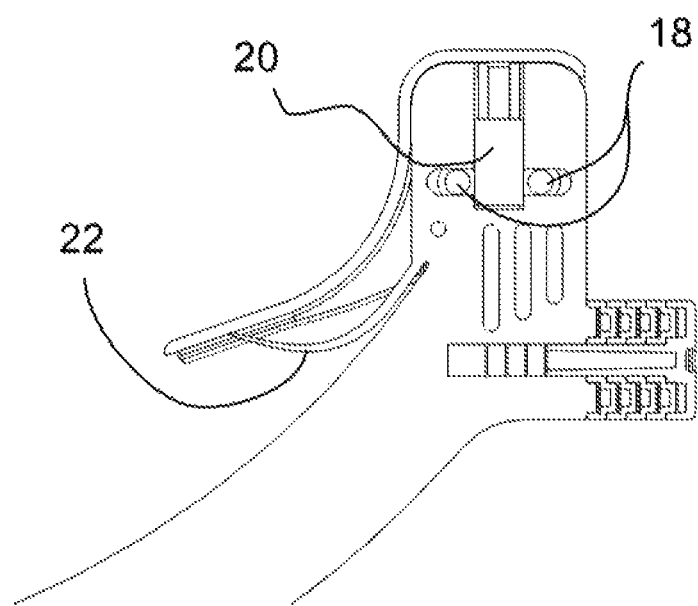
FIG. 4 Side cutaway view showing the pin and the spring.

A vehicle egress aid (10) has a longitudinal body (12) having a pair of grasping members (14) at a distal and having grasping portions (15) further including finger ridges (17) and a striker latch engaging member (18) at its opposite end to engage onto a door latch (18).

The striker latch engaging member (16) is an opening with a contour member that wraps around the exterior of the striker latch (18) and lucks onto it with a locking pin (20). The striker latch engaging means (18) allows for pressure to be applied on the body (12) not only for a user to raise himself out of a vehicle, but also to able to remain steady and stable once standing. This is very important since people likely to use this device have reduced balance and are likely to go forward after exiting the seat of the vehicle. The locking pin (20) is biased into locking mode by way of a spring (22) and is actuated by a lever member locking pin release mechanism (26) pivotally connected to the body (12), and adapted to allow the locking pin (20) to disengage from the latch. The travel of the lever member (26) is determined by a travel blocking pin (21) and grove (19) combination as is known in the art and need not be further discussed herein. The striker latch engaging member (16) slows for pressure to be applied onto the body (12) so that a user holding on to the grasping members (14) can raise himself from a sitting position onto a standing position but also go from standing to sitting.

By having a pair of grasping members (14), a user can readily choose one of two ways to hold the egress aid (10) and get up or get back to a seating position. Also, this allows a single user to select different grasping members (14) when standing up and sitting down as the dynamics are quite different (against gravity vs with gravity aid).

Because of the huge variety of car makes and models, spacers (24) can be added or removed so as to best fit against a vehicle's "B" pillar (not shown). Although the spacers (24) can be made of a stiff, non-deformable material, a pad member (28) making contact with the "B" pillar is preferably made of a softer, non abrasive material so as to not damage the paint. On the "B" pillar.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, am deemed readily apparent and obvious to one skilled in the art, and all equivalent relationships to those illustrated in the drawings and described in the specification are intended to be encompassed by the present invention.

The invention claimed is:

1. A vehicle egress aid comprising an elongated body having a pair of grasping members at a distal end thereof, a striker latch engaging member at an opposite end thereof adapted to releasable engage a vehicle door striker latch member, and a lever member locking pin release mechanism located in proximity to said striker latch engaging member and adapted to actuate said striker latch engaging member to engage with and be removed from said vehicle door striker latch member; said striker latch engaging member includes a contour member adapted to releasably wrap around said vehicle door striker latch member, a spring biases a locking pin adapted to releasably lock said contour member into place around said vehicle door striker latch member.

2. The vehicle egress aid of claim 1, further comprising at least one of a plurality of spacer member located in proximity to said striker latch engaging member and on an opposite side from said lever member, and is adapted to press against a vehicle pillar and provide a more secure connection between said vehicle egress aid and said vehicle.

3. The vehicle egress aid of claim 2, further comprising a pad member attached to said at least one spacer member and adapted to contact and protect said vehicle pillar from abrasions that may be caused by said at least one spacer member.

4. The vehicle egress aid of claim 3, wherein said pad member is formed from a material that is softer than the material forming said at least one spacer member.

5. The vehicle egress aid of claim 1, wherein said striker latch engaging member further includes said lever member which is adapted to allow said locking pin to disengage from said contour member, which in turn disengages from said vehicle door striker latch member allowing said vehicle egress aid to be removed from said vehicle door striker latch member and thereby said vehicle.

6. The vehicle egress aid of claim 1, wherein said lever member is pivotally attached to said elongated body, and includes a grip portion that is adapted to allow a user to easily grip and pivot said lever member to thereby engage said striker latch engaging member with said vehicle door striker latch member.

7. The vehicle egress aid of claim 1, wherein said pair of grasping members are spaced from one another, each have an oval shape, and each include finger ridges adapted to allow a user to more securely grab said grasping members.

8. The vehicle egress aid of claim 1, wherein the shape of said elongated body includes at least two curved portions adapted to allow said grasping members to be positioned such that said vehicle egress aid can be easily grabbed and manipulated when being installed, used, and removed.

9. The vehicle egress aid of claim 2, wherein a plurality of spacer members adapted to be removably attached one on top of the other such that the resulting thickness of said spacer members together can be adjusted to fit differently sized and shaped vehicles.

10. The vehicle egress aid of claim 1, wherein said elongated body is formed from a material chosen from a list of materials comprising plastic, metal, aluminum, ceramic, and composites thereof.

\* \* \* \* \*